United States Patent
Gall et al.

(10) Patent No.: US 11,643,116 B2
(45) Date of Patent: May 9, 2023

(54) METHOD AND DEVICE FOR OPERATING A VEHICLE

(71) Applicant: Robert Bosch GmbH, Stuttgart (DE)

(72) Inventors: Robert Gall, Heilbronn (DE); Lars Bieniek, Schwäbisch Hall (DE)

(73) Assignee: ROBERT BOSCH GMBH, Stuttgart (DE)

( * ) Notice: Subject to any disclaimer, the term of this patent is extended or adjusted under 35 U.S.C. 154(b) by 308 days.

(21) Appl. No.: 17/032,238

(22) Filed: Sep. 25, 2020

(65) Prior Publication Data

US 2021/0146961 A1 May 20, 2021

(30) Foreign Application Priority Data

Nov. 15, 2019 (DE) .......................... 102019217637.2

(51) Int. Cl.
*B60W 60/00* (2020.01)
*G01C 21/34* (2006.01)

(52) U.S. Cl.
CPC .... *B60W 60/0053* (2020.02); *B60W 60/0015* (2020.02); *G01C 21/3461* (2013.01); *B60W 2420/42* (2013.01); *B60W 2420/52* (2013.01)

(58) Field of Classification Search
CPC ......... B60W 60/0053; B60W 60/0015; B60W 2420/42; B60W 2420/52; B60W 2556/20; B60W 2556/35; B60W 60/0059; B60W 50/00; B60W 2050/0043; G01C 21/3461
See application file for complete search history.

(56) References Cited

PUBLICATIONS

Wolf, Michael T., and Joel W. Burdick. "Artificial potential functions for highway driving with collision avoidance." 2008 IEEE International Conference on Robotics and Automation. IEEE, 2008. (Year: 2008).*
Johnson, Jeffrey Kane. "Constant space complexity environment representation for vision-based navigation." arXiv preprint arXiv: 1709.03947 (2017). (Year: 2017).*

* cited by examiner

*Primary Examiner* — Alan D Hutchinson
(74) *Attorney, Agent, or Firm* — Norton Rose Fulbright US LLP; Gerard Messina

(57) ABSTRACT

A method for operating a vehicle, in particular, a vehicle for highly automated driving. The method includes a step of reading in input data. The input data include sensor data and sensor state data of a multitude of sensor units of vehicle. The method also includes a step of generating a potential field, using the input data. The input data are used as attractive potentials and repulsive potentials of the potential field. The method furthermore includes a step of determining a trajectory through the potential field in order to generate a fusion signal, using the trajectory, for fusing the input data for a sensor data fusion for a highly automated driving operation of the vehicle.

9 Claims, 6 Drawing Sheets

METHOD AND DEVICE FOR OPERATING A VEHICLE

CROSS REFERENCE

The present application claims the benefit under 35 U.S.C. § 119 of German Patent Application No. DE 102019217637.2 filed on Nov. 15, 2019, which is expressly incorporated herein by reference in its entirety.

FIELD

The present invention is directed to a device and to a method for operating a vehicle. The present invention also relates to a computer program.

BACKGROUND INFORMATION

Systems for the automated and autonomous guidance of motor vehicles and also of further vehicles, such as of ships, are con conventional. For example, options of a so-called tactical intelligence, surveillance and reconnaissance (ISR) from a single sensor imager may be expanded into integrated systems-of-systems architectures in the process. Such systems may increasingly include multiple detection options, which may serve as multipliers for algorithms of such automated and autonomous systems. Conventionally, individual sensors operating largely independently of one another may be used, which may offer a selection of operating modes.

SUMMARY

The present invention provides a method, a device using this method, and a corresponding computer program. Advantageous embodiments and refinements of the present invention are described herein.

According to specific embodiments of the present invention, in particular, a sensor fusion management system and a sensor fusion management method may be provided, which, using an algorithm according to the potential field method, implemented for example in an evaluation and decision-making unit, is able to manage multiple collaborating sensor systems or sensor units in a dynamic, scalable and integrated manner. Such a sensor fusion management system and sensor fusion management method may be used, in particular, for highly automatedly driving vehicles, in particular, motor vehicles, in terms of its active principle.

According to specific embodiments of the present invention, in particular, an integrated and intelligent sensor fusion management system (SFS) and sensor fusion management method may advantageously be provided to render a highly automated driving operation of a vehicle particularly safe and reliable. In this way, a weighting of pieces of sensor information may be optimized. A system safety and availability may also be enhanced. Moreover, system response times and/or operator or driver take-over times may be extended. In particular, a so-called OODA (observe, orient, decide, act) time may be expanded or extended in highly automated or autonomous driving situations, the OODA time being infinite in a theoretical ideal state.

In this connection, the expression "in the loop" shall be mentioned, which may be used here to describe how connected someone is to a decision-making process, in particular, a system decision-making process, an operator take-over process and/or a driver take-over process. With increasing automation, an understanding as to how the system/person and operator or driver behaves in a readiness stage or "stand-by stage"—the so-called "in the loop"—may thus be improved.

Practical examples for a use of the sensor fusion management system (SFS) and sensor fusion management method include, for example, a reduction of a shut-off of the system due to environmental influences for preventing or minimizing performance losses and blindness due to media impact such as contamination and/or weather influences. A reduction of a shut-off of the system due to hardware influences is also possible. With respect to a safety relevance, a shut-off or fallback level in the event of blindness of a sensor due to targeted interference or attacks from outside, e.g., blinding of the LIDAR/radar system, may be reduced. With respect to a cyber security relevance, a fallback level may be created in the event of a "hostile" system take-over.

A method for operating a vehicle, in particular, a vehicle for highly automated driving, is provided in accordance with the present invention. In an example embodiment of the present invention, the method includes the following steps:

reading in input data, the input data including sensor data and sensor state data of a multitude of sensor units of the vehicle;

generating a potential field using the input data, the input data being used as attractive potentials and repulsive potentials of the potential field; and determining a trajectory through the potential field to generate a fusion signal, using the trajectory, for fusing the input data for a sensor data fusion for a highly automated driving operation of the vehicle.

This example method may, for example, be implemented in software or hardware or in a mixed form made up of software and hardware, for example in a control unit or a device. The vehicle may be a motor vehicle, in particular, a land vehicle, a water craft, a spacecraft or an aircraft, for example a passenger car or a commercial vehicle. This method may be executable to carry out or to control the sensor data fusion. During the fusion of the input data, the sensor data may be fused. The steps of the method may be carried out repeatedly, continuously or intermittently.

According to one specific embodiment of the present invention, the trajectory determined in the step of determining may cause that an operating state of the vehicle in the highly automated driving operation is transferred into a state of minimal criticality during a use of the fusion signal by a system for sensor data fusion of the vehicle. The fusion signal may indicate in the process a fusion of sensor data of such sensor units whose sensor state data represent a reliability value above a reliability threshold. Such a specific embodiment offers the advantage that a safe operation of the vehicle may also be enabled during the highly automated driving, thanks to a reliable sensor data fusion.

In particular, the input data read-in in the step of reading in may include surroundings data, which represent surroundings conditions in surroundings of the vehicle, and trip data, which represent at least one physical variable with respect to a driving operation of the vehicle, as sensor data. The surroundings data may represent physical surroundings of the vehicle detected with the aid of at least one sensor unit. In the process, the surroundings data may also include weather data, position data and, in addition or as an alternative, further surroundings data which represent at least one variable condition of the surroundings of the vehicle. The trip data may include an acceleration, a speed, and, in addition or as an alternative, other trip data which represent at least one static or dynamic property of the vehicle. In addition or as an alternative, the input data read-in in the step of reading in may include availability data, which represent an availability of individual sensor units as sensor state data. The availability data may include at least one confidence factor, at least one range parameter, at least one blindness parameter, and, in addition or as an alternative, at least one safety parameter with respect to at least one of the sensor units. Such a specific embodiment offers the advantage that a versatile and meaningful data basis may be utilized for the sensor data fusion.

Furthermore, the input data may be linked to one another into a three-dimensional potential field in the step of generating, using a potential field model and, in addition or as an alternative, a potential field function. In addition or as an alternative, the potential field may represent at least one predefined relationship between selected input data and a criticality which is combined in a single state space. Such a specific embodiment offers the advantage that such a potential field algorithm is particularly well-suited for the application in question since it means an analytical representation, little memory consumption, and a dynamic adaptation time.

Moreover, the potential field may be generated in real time in the step of generating. In addition or as an alternative, in the step of generating, the potential field may be generated scene by scene during the highly automated driving operation of the vehicle. A scene may represent a traffic situation which encompasses the vehicle, and optionally in addition to is a further vehicle in a defined spatial and/or temporal relationship. In addition or as an alternative, in the step of generating, the potential field may be generated during the highly automated driving operation of the vehicle, using and adapting learned or predefined scenes. Such a specific embodiment offers the advantage that instantaneous events and conditions which relate to the vehicle may be taken into consideration reliably and exactly during the sensor data fusion to safely operate the vehicle.

In particular, the trajectory determined in the step of determining may identify a linkage of sensor state data having minimal criticality. In addition or as an alternative, the fusion signal may cause an extension of the highly automated driving operation, a decision-making time, and, in addition or as an alternative, a take-over time prior to the abortion of the highly automated driving operation. Such a specific embodiment offers the advantage that a highly automated driving operation of the vehicle may be implemented in a safe and stable manner by enabling a reliability-oriented and availability-oriented sensor data fusion.

The example method may also include a step of providing the fusion signal for output to an interface to a unit of a system for sensor data fusion of the vehicle. The fusion signal may be designed to cause a weighting of sensor data during a use by the system for sensor data fusion. Such a specific embodiment offers the advantage that a safety-oriented and optimized fusion may also be implemented using sensor data which stem from sensor units which are assigned to different sub-systems of the vehicle.

The present invention described herein furthermore provides a device which is designed to carry out, activate or implement the steps of a variant of a method described here in corresponding units. The object underlying the present invention may also be achieved quickly and efficiently by this embodiment variant of the present invention in the form of a device.

In accordance with an example embodiment of the present invention, the device may include at least one processing unit for processing signals or data, at least one memory unit for storing signals or data, at least one interface to a sensor or an actuator for reading in sensor signals from the sensor or for outputting data signals or control signals to the actuator and/or at least one communication interface for reading in or outputting data which are embedded into a communication protocol. The processing unit may be a signal processor, a microcontroller or the like, for example, it being possible for the memory unit to be a Flash memory, an EEPROM or a magnetic memory unit. The communication interface may be designed to read in or output data wirelessly and/or in a hard-wired manner, a communication interface which may read in or output hard-wired data being able to read in these data, for example electrically or optically, from a corresponding data transmission line or being able to output these into a corresponding data transmission line.

A device may presently be understood to mean an electrical device which processes sensor signals and outputs control and/or data signals as a function thereof. The device may include an interface which may be designed as hardware and/or software. In the case of a hardware design, the interfaces may, for example, be part of a so-called system ASIC which includes a wide variety of functions of the device. However, it is also possible for the interfaces to be separate integrated circuits, or to be at least partially made up of discrete elements. In the case of a software design, the interfaces may be software modules which are present on a microcontroller, for example, alongside other software modules.

In one advantageous embodiment of the present invention, the device carries out a control of a sensor data fusion for the operation of a vehicle, in particular, for a highly automated driving operation. For this purpose, the device may access sensor signals, for example, such as camera signals, radar signals, LIDAR signals and the like. The potential field generation takes place by a signal processing and modeling using a suitable algorithm, which includes a potential field function, for example. The device is designed to provide a fusion signal as output, which is suitable for controlling the sensor data fusion.

In addition, a computer program product or computer program is advantageous, having program code which may be stored on a machine-readable carrier or memory medium such as a semiconductor memory, a hard disk memory or an optical memory, and which is used to carry out, implement and/or activate the steps of the method according to one of the specific embodiments described above, in particular if the program product or program is executed on a computer or a device.

Exemplary embodiments of the present invention described herein are shown in the figures and are described in greater detail in the description below.

DETAILED DESCRIPTION OF EXAMPLE EMBODIMENTS

Figure 1:
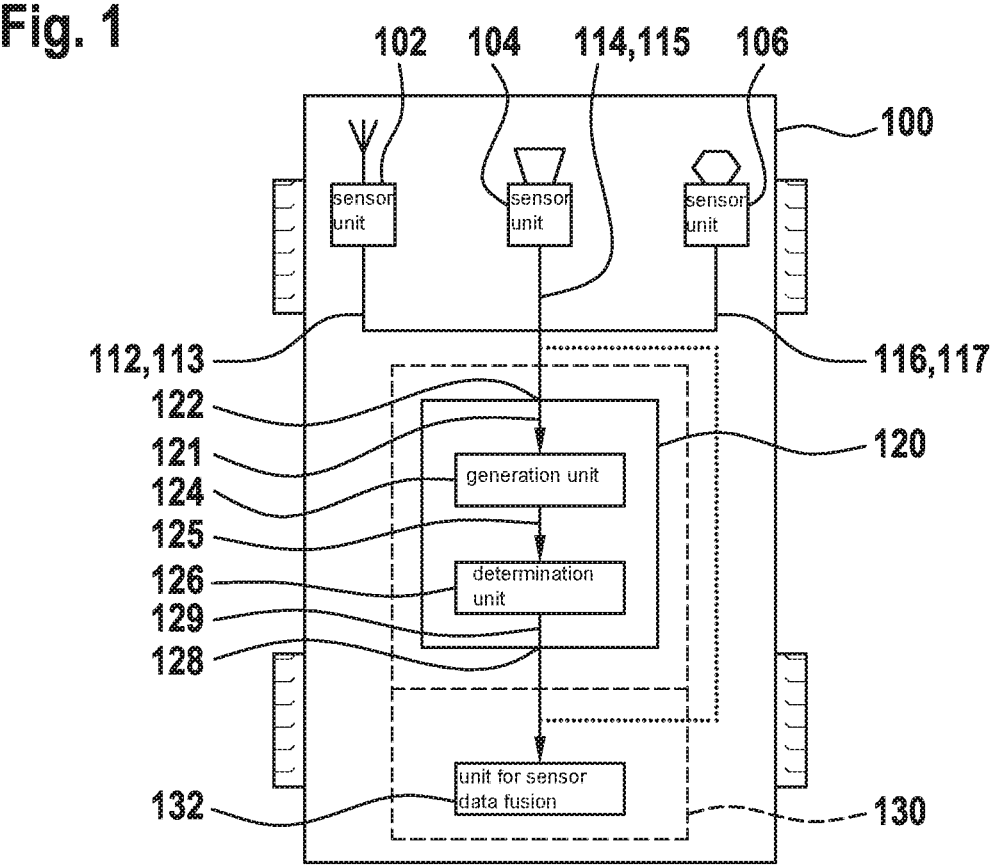
FIG. 1 shows a schematic representation of a vehicle including a device according to one exemplary embodiment of the present invention.

In the description below of favorable exemplary embodiments of the present invention, identical or similar reference numerals are used for similarly acting elements shown in the different figures, and a repeated description of these elements is dispensed with.

FIG. 1 shows a schematic representation of a vehicle 100 including a device 120 according to one exemplary embodiment of the present invention. Device 120 is designed for operating vehicle 100. In other words, device 120 is designed to control an operation of vehicle 100. Vehicle 100 is a motor vehicle, for example a land vehicle, in particular, a passenger car, a truck or another commercial vehicle. Vehicle 100 is suitable for highly automated driving or for a highly automated driving operation.

Vehicle 100 includes a multitude of sensor units 102, 104, 106. In the representation of FIG. 1, only three sensor units 102, 104, 106 are shown by way of example. For example, a first sensor unit 102 is designed as a radar sensor for detecting surroundings of vehicle 100, a second sensor unit 104 is, for example, designed as a camera for detecting the surroundings of vehicle 100, and a third sensor unit 106 is, for example, designed as a LIDAR sensor for detecting the surroundings of vehicle 100. First sensor unit 102 is designed to provide first sensor data 112, which according to the exemplary embodiment shown here represent the surroundings of vehicle 100 detected with the aid of radar. First sensor unit 102 is furthermore designed to provide first sensor state data 113, which represent at least one state variable with respect to an instantaneous state of first sensor unit 102. Second sensor unit 104 is designed to provide second sensor data 114, which, according to the exemplary embodiment shown here, represent the surroundings of vehicle 100 detected with the aid of a camera lens system. Second sensor unit 104 is furthermore designed to provide second sensor state data 115, which represent at least one state variable with respect to an instantaneous state of second sensor unit 104. Third sensor unit 106 is designed to provide third sensor data 116, which, according to the exemplary embodiment shown here, represent the surroundings of vehicle 100 detected with the aid of LIDAR. Third sensor unit 106 is furthermore designed to provide third sensor state data 117, which represent at least one state variable with respect to an instantaneous state of third sensor unit 106.

Vehicle 100 furthermore includes a device 120 for operating, or operating device 120. Device 120 is connected to sensor units 102, 104, 106 in a signal transmission-capable manner. Device 120 is designed to generate a fusion signal 129, which is usable for operating vehicle 100, using sensor data 112, 114, 116 and sensor state data 113, 115, 117 as input data 121.

Device 120 is designed to read in sensor data 112, 114, 116 and sensor state data 113, 115, 117 from sensor units 102, 104, 106 as input data 121. According to the exemplary embodiment shown here, device 120 includes a generation unit 124 and a determination unit 126, as well as an input interface 122 and an output interface 128. Device 120 is designed to read in input data 121 from input interface 122 to sensor units 102, 104, 106. Generation unit 124 is designed to generate a potential field, using input data 121. Generation unit 124 is designed to use input data 121 as attractive potentials and repulsive potentials of the potential field during the generation of the potential field. In particular, generation unit 124 is designed to provide potential field data 125, which represent the generated potential field, to determination unit 126. Determination unit 126 is designed to generate fusion signal 128, using potential field data 125. For this purpose, determination unit 126 is, more precisely, designed to determine a trajectory through the potential field in order to generate fusion signal 129, using the trajectory, for fusing input data 121 for a sensor data fusion for the highly automated driving operation of vehicle 100. Within the scope of the sensor data fusion, sensor data 112, 114, 116 are weighted, for example, using fusion signal 129.

According to the exemplary embodiment shown here, device 120 is furthermore designed to provide fusion signal 129 for output to output interface 128 to a unit 132 of a system 130 for sensor data fusion of vehicle 100. According to the exemplary embodiment shown here, vehicle 100 also includes system 130. System 130 includes at least unit 132. Unit 132 is connected to sensor units 102, 104, 106 in a signal transmission-capable manner. According to one exemplary embodiment, device 120 is implemented as part of system 130. According to another exemplary embodiment, device 120 is implemented separately from system 130 and connected to system 130 in a signal transmission-capable manner.

Figure 2:
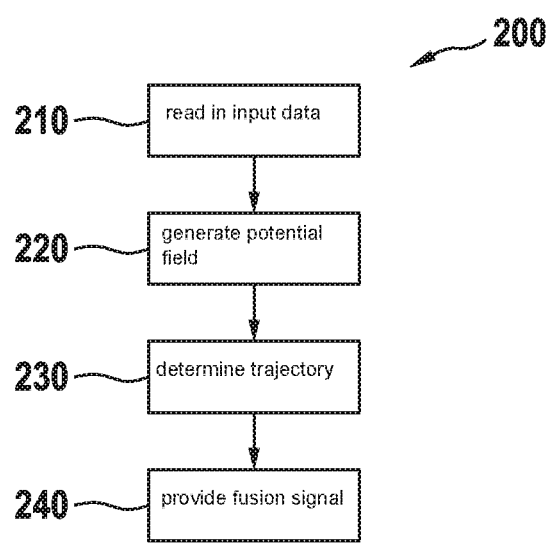
FIG. 2 shows a flow chart of a method for operating a vehicle according to one exemplary embodiment of the present invention.

FIG. 2 shows a flow chart of a method 200 for operating according to one exemplary embodiment of the present invention. Method 200 is executable for operating a vehicle, in particular, a vehicle for highly automated driving or a highly automated driving operation. In particular, method 200 is executable for operating the vehicle from FIG. 1 or a similar vehicle. Method 200 may be carried out using the device from FIG. 1 or a similar device.

In a step 210 of reading in, input data are read in, which include sensor data and sensor state data of a multitude of sensor units of the vehicle. A potential field is generated thereafter in a step 220 of generating, using the input data read-in in step 210 of reading in. In the process, the input data are used as attractive potentials and repulsive potentials of the potential field. In a step 230 of determining, a trajectory is thereafter determined through the potential field generated in step 220 of generating, in order to generate a fusion signal, using the trajectory, for fusing the input data for a sensor data fusion for a highly automated driving operation of the vehicle.

According to one exemplary embodiment, method 200 also includes a step 240 of providing the fusion signal, generated within the scope of step 230 of determining, for output to an interface to a unit of a system for the sensor data fusion of the vehicle.

Figure 3:
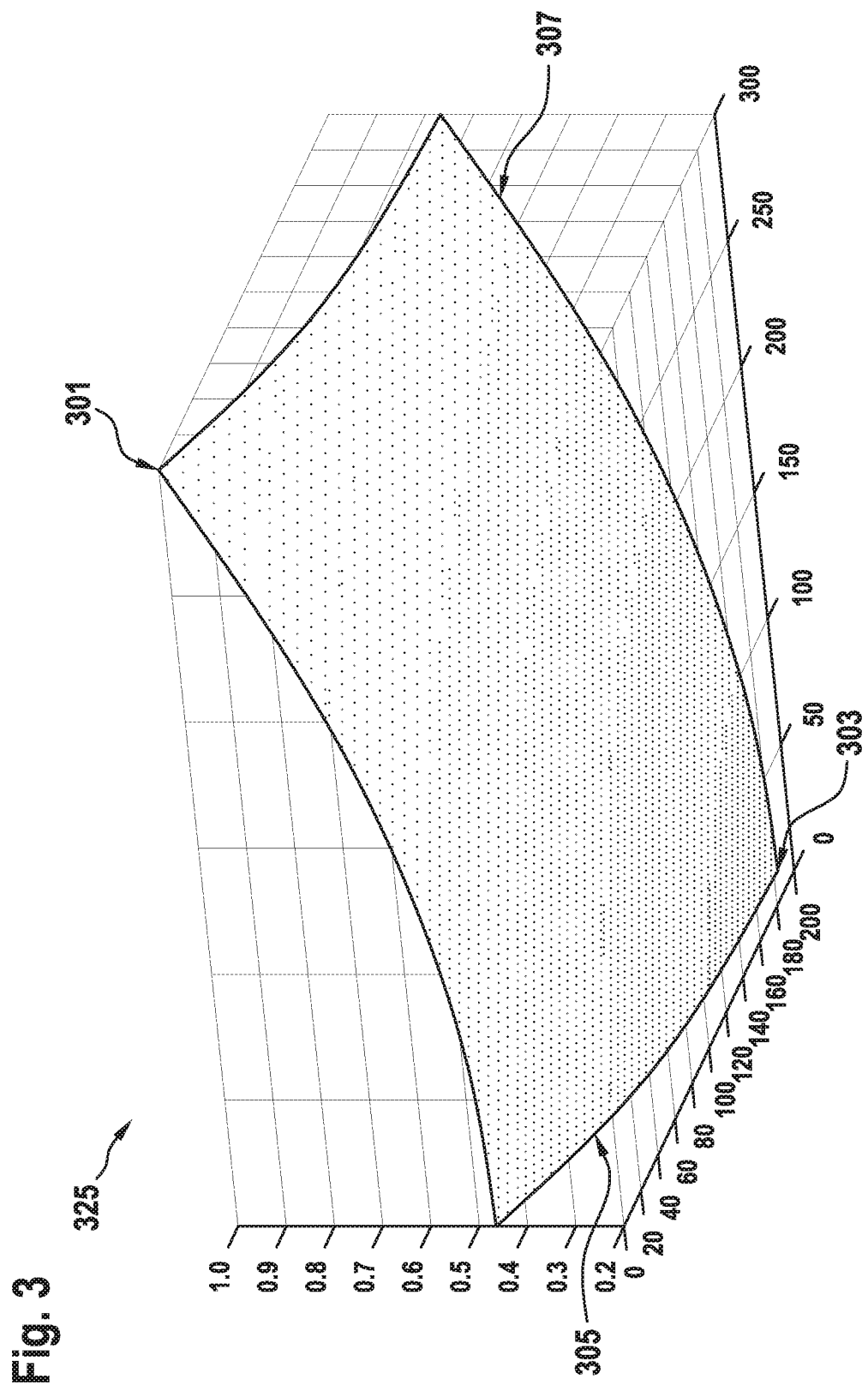
FIG. 3 shows a schematic diagram of a potential field according to one exemplary embodiment of the present invention.

FIG. 3 shows a schematic diagram of a potential field 325 according to one exemplary embodiment of the present invention. Potential field 325 corresponds to or resembles the potential field which is represented by the potential field data in FIG. 1. In other words, FIG. 3 more precisely shows a quantitative, three-dimensional potential field including fused sensor data and a progression field from a state of maximum criticality 301 toward the safest state or state of minimal criticality 303. A numerical value of 1 may be assigned to maximum criticality 301. A numerical value of 0 may be assigned to minimum criticality 303. Potential field 325 shows a first dependency 305 or a first relationship 305 between criticality and sensor range and/or sensor quality as well as a second dependency 307 or a second relationship 307 between criticality and a speed of the vehicle.

Figure 4:
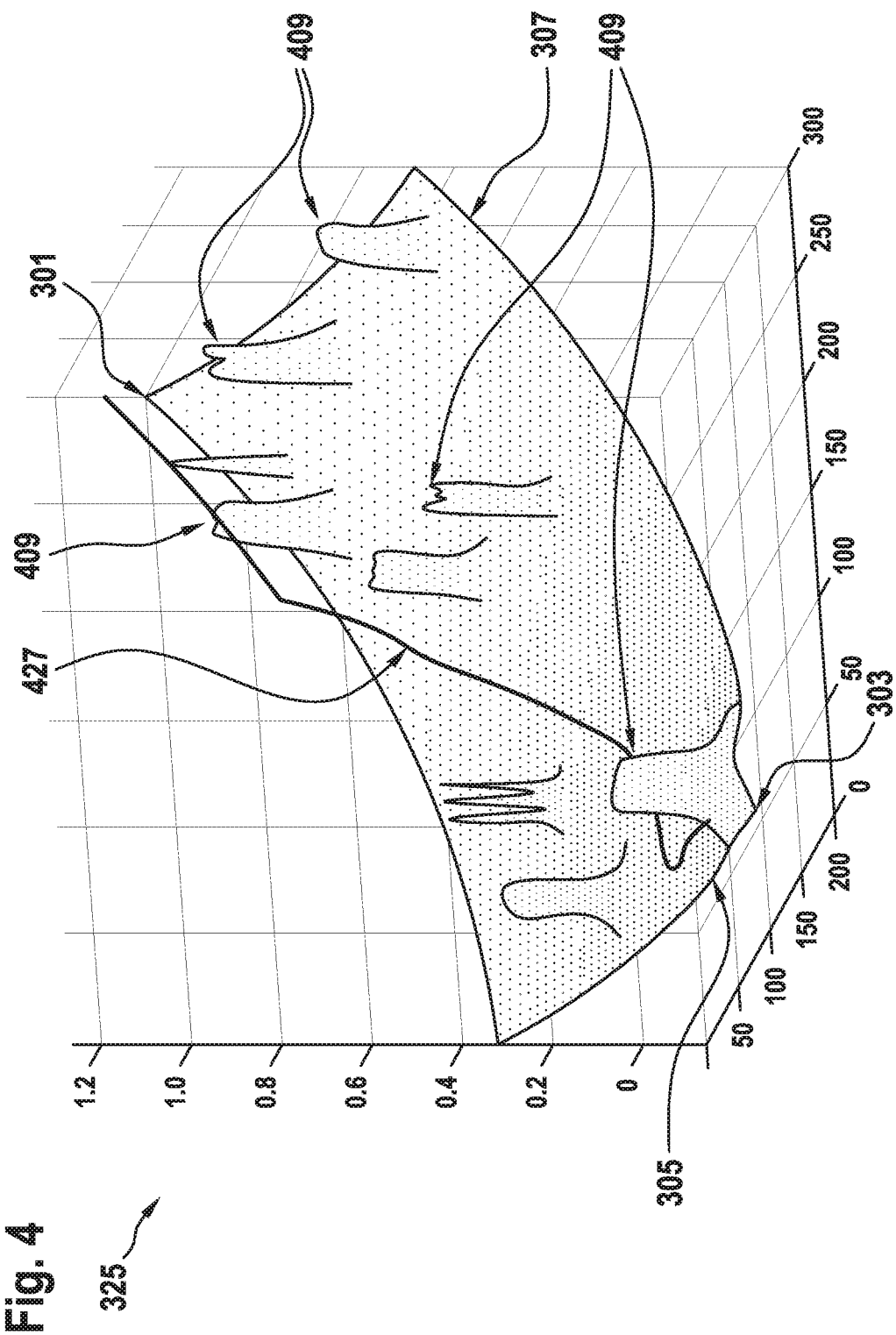
FIG. 4 shows a schematic diagram of a potential field according to one exemplary embodiment of the present invention.

FIG. 4 shows a schematic diagram of a potential field 325 according to one exemplary embodiment. Potential field 325 in FIG. 4 corresponds to the potential field from FIG. 3, with the exception that additionally a multitude of sensor-specific criticality peaks 409 as well as trajectory 427 described with reference to FIGS. 1 and 2 are shown. In other words, FIG. 4 more precisely shows a quantitative, three-dimensional potential field including fused sensor data and trajectory 427 as the optimal progression or progression path from the state of maximum criticality 301 toward the safest state or state of minimum criticality 303 across the scene and including sensor-specific criticality peaks 409.

Figure 5:
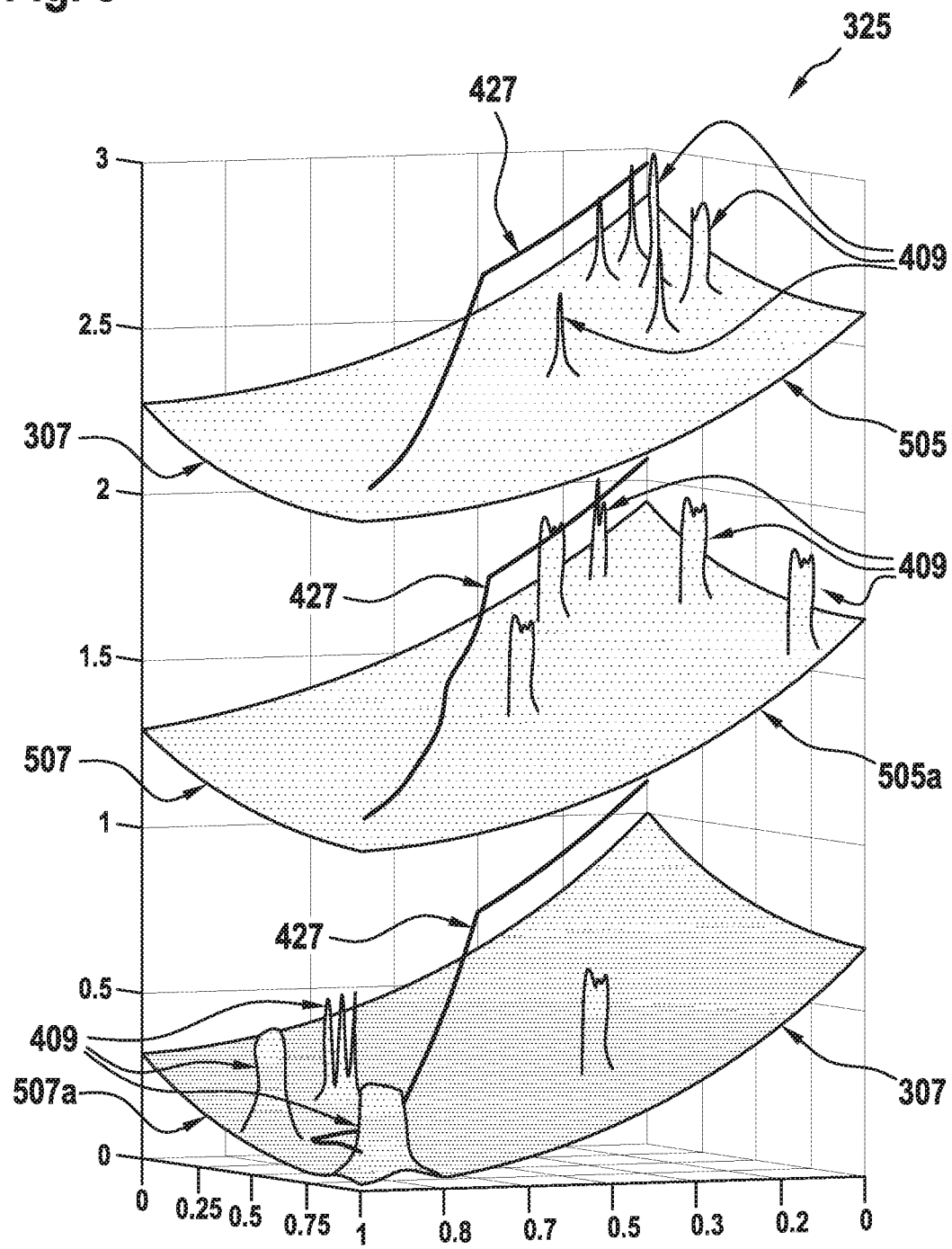
FIG. 5 shows a schematic diagram of a potential field according to one exemplary embodiment of the present invention.

FIG. 5 shows a schematic diagram of a potential field 325 according to one exemplary embodiment. Potential field 325 in FIG. 5 resembles the potential field from FIG. 4, potential field 325 in FIG. 5 representing a quantitative, three-dimensional potential field 325 including multiple different dependencies in three progression fields or planes. A trajectory 427 and a multitude of sensor-specific criticality peaks 409 are plotted in each plane. A first plane shows second dependency 307, known from FIG. 3, between criticality and the inherent speed or the vehicle speed, as well as a further dependency 505 between criticality and sensor fusion management. A second plane furthermore shows a further dependency 507 between criticality and sensor signal quality or sensor data quality, as well as an additional dependency 505a between criticality and the inherent lane planning. Finally, a third plane furthermore shows an additional dependency 507a between criticality and sensor reliability quality or sensor security quality, as well as second dependency 307, known from FIG. 3, between criticality and the inherent speed or the vehicle speed.

Figure 6:
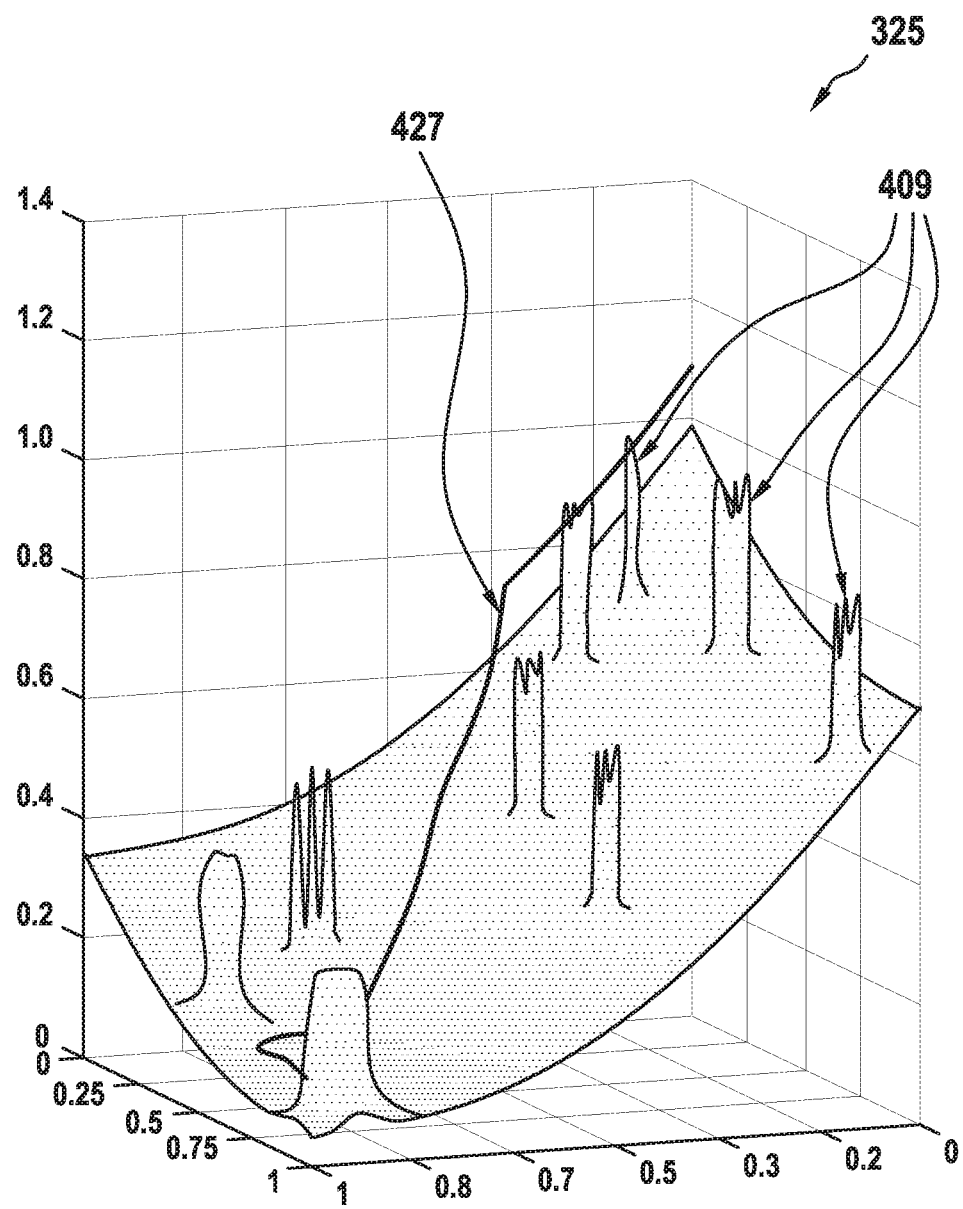
FIG. 6 shows a schematic diagram of a potential field according to one exemplary embodiment of the present invention.

FIG. 6 shows a schematic diagram of a potential field 325 according to one exemplary embodiment of the present invention. More precisely, FIG. 6 shows the potential field from FIG. 5 including planes superimposed in a single progression field or state space. In other words, FIG. 6 shows a quantitative, three-dimensional potential field 325 including fused sensor data and including dependencies combined in a single state space. In the process, the multitude of sensor-specific criticality peaks 409 and trajectory 427 are also plotted as a combined trajectory.

Figure 7:
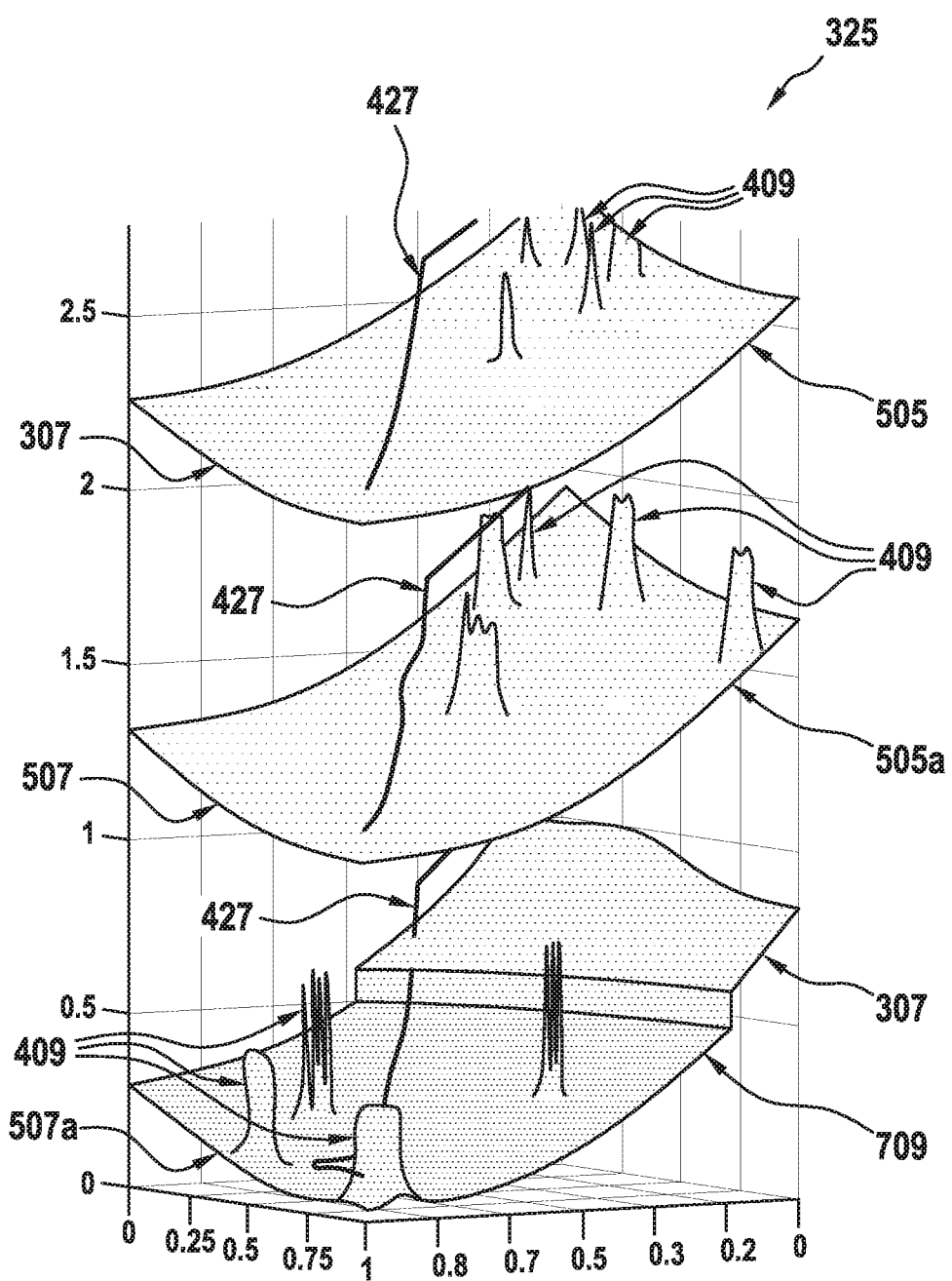
FIG. 7 shows a schematic diagram of a potential field according to one exemplary embodiment of the present invention.

FIG. 7 shows a schematic diagram of a potential field 325 according to one exemplary embodiment of the present invention. The representation and potential field 325 in FIG. 7 correspond to the representation and the potential field from FIG. 5, with the exception that an influence 709 due to rain is additionally shown in the diagram in FIG. 7. In other words, FIG. 7 shows a quantitative, three-dimensional potential field 324 including fused sensor data and influence 709 due to rain. Influence 709 due to rain is, in particular, apparent in the third plane or in the third progression field.

With reference to the above-described figures, exemplary embodiments will be briefly explained again hereafter in summary and in other words.

To extend the OODA time or to maximize a system availability, an optimum from all sensor availability features or sensor state data 113, 115, 117 is identified by executing method 200, or with the aid of device 120, e.g., blindness, range, confidence factors, etc. This yields, as potential field 325, a virtual 3D area, which is influenced by external conditions or influences 709, such as weather, traffic situation, dynamic conditions, etc. Input data 121 read-in in step 210 of reading in, or with the aid of device 120, include, as sensor data 112, 114, 116, in particular surroundings data, which represent surroundings conditions in surroundings of vehicle 100, and trip data, which represent at least one physical variable with respect to a driving operation of vehicle 100, and include, as sensor state data 113, 115, 117, in particular, availability data, which represent an availability of individual sensor units 102, 104, 106. The availability data include at least one confidence factor, at least one range parameter, at least one blindness parameter, and/or at least one safety parameter with respect to at least one of sensor units 102, 104, 106.

In step 220 of generating, or with the aid of generation unit 124 of device 120, input data 121 are linked to one another into three-dimensional potential field 325, using a potential field model and/or a potential field function. In addition or as an alternative, potential field 325 represents at least one predefined relationship between selected input data 121 and a criticality which is combined in a single state space; see dependencies 305, 307, 505, 505a, 507, 507a in FIGS. 3 through 7. According to one exemplary embodiment, in step 220 of generating or with the aid of generation unit 124 of device 120, potential field 325 is generated in real time and/or scene-by-scene during the highly automated driving operation of vehicle 100 and/or using and adapting learned or predefined scenes during the highly automated driving operation of vehicle 100. Such an algorithm based on the potential field method is particularly well-suited for the intelligent sensor fusion management system represented by device 120 and method 200, since an analytical representation, little memory consumption, a real time calculation capability, a dynamic adaptability, etc. are provided.

According to one exemplary embodiment of the present invention, the algorithm links all available pieces of sensor information or input data 121 via a potential field model, and dynamically generates a potential field 325 as a 3D area in real time. Optionally, learned scenes are also adapted in the process in a superimposing manner. Potential field 325 or potential field model, which is made up of the attracting and repulsing potentials, may be described with the aid of a potential field function. Potential field 325 is obtained by the superimposition of attracting and repulsing potentials, i.e., elementary potentials. The potential function may be described by the relationship $U_{final}=U_{at}+U_{aux}$. $U_{at}$ represents the attracting or attractive components, and $U_{re}$ represents the repulsing or repulsive components of the potential function. By using a negative gradient on the right side of the relationship, this becomes: $F_{final}=F_{at}+F_{re}+F_{aux}$. This resulting force is also referred to as a virtual force. With it, an optimal trajectory 427 through potential field 325, or a progression path, may be found since it indicates the direction and speed to the destination.

Trajectory 427 determined in step 230 of determining, or with the aid of determination unit 126 of device 120, thus, in particular, causes an operating state of vehicle 100 in the highly automated driving operation to be transferred into a state of minimal criticality 303, during a use of fusion signal 129 by system 130 for the sensor data fusion of vehicle 100. In particular, trajectory 427 identifies a linkage of sensor state data 113, 115, 117 with minimal criticality. In addition or as an alternative, fusion signal 129 generated in step 230 of determining, or with the aid of determination unit 126 of device 120, causes an extension of the highly automated driving operation, a decision-making time and/or a take-over time prior to an abortion of the highly automated driving operation of vehicle 100.

According to one exemplary embodiment of the present invention, the attracting and repulsing potentials or forces of potential field 325 are defined in such a way that they optimally reflect sensor data 112, 114, 116 and sensor availability features or sensor state data 113, 115, 117. In this way, customer-specific and vehicle-specific data sets may be implemented. In this way, a fluid or continuous transition between individual states may also be represented. Additionally, it is made possible that a sensor architecture is freely selectable, and the system remains scalable; see also FIG. 3 and FIG. 4.

FIG. 5 shows, by way of example, a real traffic situation, including three different sensor states or multiple dependencies, for example a dependency of the criticality on the inherent speed on the sensor range, a dependency of the criticality on the inherent lane planning, e.g., lane selection, on the sensor signal quality, e.g., blindness indicators during poor weather, a dependency of the criticality on the sensor fusion management, e.g., number of activated sensor units 102, 104, 106, on the sensor security quality, e.g., creation of a fallback level during a "hostile" system take-over. These dependencies 307, 505, 505a, 507, 507a from FIG. 5 are combined in a single state space; see FIG. 6. FIG. 7 moreover shows by way of example how a change in the states has an influence 709 due to rain, snow or the like on the entire sensor management, and also how easily a solution may be found with trajectory 427.

If one exemplary embodiment of the present invention includes an "and/or" linkage between a first feature and a second feature, this should be read in such a way that the exemplary embodiment according to one specific embodiment includes both the first feature and the second feature, and according to an additional specific embodiment includes either only the first feature or only the second feature.

What is claimed is:

1. A method for operating a vehicle for automated driving, the method comprising:
   reading in input data, the input data including sensor data and sensor state data of a multitude of sensor units of the vehicle;
   generating potential field using the input data, the input data being used as attractive potentials and repulsive potentials of the potential field; and
   determining a trajectory through the potential field to generate a fusion signal, using the potential field data, which represent the generated potential field, for fusing the input data for a sensor data fusion for the automated driving operation of the vehicle, wherein the sensor data are weighted using the fusion signal;
   wherein the potential field is a three-dimensional potential field including the fused sensor data and a progression field from a state of a maximum criticality toward a safest state, which is a state of a minimal criticality.

2. The method as recited in claim 1, wherein the trajectory determined in the step of determining causes an operating state of the vehicle in the highly automated driving operation to be transferred into a state of minimal criticality, during a use of the fusion signal by a system for the sensor data fusion of the vehicle.

3. The method as recited in claim 1, wherein the input data read-in in the step of reading in include, as the sensor data, surroundings data, which represent surroundings conditions in surroundings of the vehicle, and trip data, which represent at least one physical variable with respect to a driving operation of the vehicle, and include, as the sensor state data, availability data, which represent an availability of individual ones of the sensor units, the availability data including at least one of: at least one confidence factor, at least one range parameter, at least one blindness parameter, and at least one safety parameter with respect to at least one of the sensor units.

4. The method as recited in claim 1, wherein at least one of the following is satisfied: (i) in the step of generating, the input data are linked to one another into a three-dimensional potential field, using at least one of a potential field model and a potential field function and (ii) the potential field represents at least one predefined relationship between selected data of the input data and a criticality which is combined in a single state space.

5. The method as recited in claim 1, wherein, in the step of generating, the potential field is generated based on at least one of the following: (i) in real time and/or scene-by-scene during the automated driving operation of the vehicle, and (ii) using and adapting learned or predefined scenes during the automated driving operation of the vehicle.

6. The method as recited in claim 1, wherein at least one of the following is satisfied: (i) the trajectory determined in the step of determining identifies a linkage of those of the sensor state data with minimal criticality and (ii) the fusion signal causes at least one of the following: (a) an extension of the automated driving operation, and (b) a decision-making time and/or a take-over time prior to an abortion of the automated driving operation.

7. The method as recited in claim 1, further comprising:
   providing the fusion signal for output to an interface to a unit of a system for the sensor data fusion of the vehicle.

8. An apparatus to operate a vehicle for automated driving, comprising:
   a device configured to perform the following:
      reading in input data, the input data including sensor data and sensor state data of a multitude of sensor units of the vehicle;
      generating a potential field using the input data, the input data being used as attractive potentials and repulsive potentials of the potential field; and
      determining a trajectory through the potential field to generate a fusion signal, using the potential field data, which represent the generated potential field, for fusing the input data for a sensor data fusion for the automated driving operation of the vehicle, wherein the sensor data are weighted using the fusion signal;
      wherein the potential field is a three-dimensional potential field including the fused sensor data and a progression field from a state of a maximum criticality toward a safest state, which is a state of a minimal criticality.

9. A non-transitory machine-readable memory medium, on which is stored a computer program, which is executable by a processor, comprising:
   a program code arrangement having program code for operating a vehicle for automated driving by performing the following:
      reading in input data, the input data including sensor data and sensor state data of a multitude of sensor units of the vehicle;
      generating a potential field using the input data, the input data being used as attractive potentials and repulsive potentials of the potential field; and determining a trajectory through the potential field to generate a fusion signal, using the potential field data, which represent the generated potential field, for fusing the input data for a sensor data fusion for the automated driving operation of the vehicle, wherein the sensor data are weighted using the fusion signal;

wherein the potential field is a three-dimensional potential field including the fused sensor data and a progression field from a state of a maximum criticality toward a safest state, which is a state of a minimal criticality.

\* \* \* \* \*